(12) United States Patent
Steenackers et al.

(10) Patent No.: US 6,260,652 B1
(45) Date of Patent: Jul. 17, 2001

(54) EXHAUST SYSTEM FOR A MOTOR VEHICLE AND MOTOR VEHICLE AND METHOD FOR THE FORMATION OF AN EXHAUST SYSTEM

(75) Inventors: Pieter Delfina Steenackers, Heverlee; John W. Jörg Alexnat, Vliermaal, both of (BE)

(73) Assignee: Scambia Industrial Developments AG, Schaan (LI)

(*) Notice: Subject to any disclaimer, the term of this patent is extended or adjusted under 35 U.S.C. 154(b) by 0 days.

(21) Appl. No.: 09/067,430

(22) Filed: Apr. 27, 1998

(30) Foreign Application Priority Data

Apr. 28, 1997 (CH) .................................................. 987/97

(51) Int. Cl.⁷ .................................................. B60K 13/04
(52) U.S. Cl. .............................. 180/296; 180/309; 60/322
(58) Field of Search .................................. 180/89.2, 309, 180/296; 60/322, 323; 248/58, 60

(56) References Cited

U.S. PATENT DOCUMENTS

| | | | | |
|---|---|---|---|---|
| 3,459,444 | * | 8/1969 | Rofe | 180/296 |
| 3,942,599 | * | 3/1976 | Shimada | 180/296 |
| 4,074,525 | * | 2/1978 | Salver | 60/322 |
| 4,345,430 | * | 8/1982 | Pallo et al. | 60/322 |
| 4,676,332 | * | 6/1987 | Saito | 180/89.2 |
| 5,069,487 | * | 12/1991 | Sheppard | 285/226 |
| 5,195,607 | * | 3/1993 | Shimada et al. | 180/296 |
| 5,251,720 | * | 10/1993 | Hasetoh et al. | 180/297 |
| 5,323,989 | * | 6/1994 | Hamada et al. | 248/60 |
| 5,340,165 | * | 8/1994 | Sheppard | 285/226 |
| 5,988,308 | * | 11/1999 | Qutub | 180/309 |

FOREIGN PATENT DOCUMENTS

| | | | |
|---|---|---|---|
| 0750100 | * | 12/1996 | (EP) . |
| 1-296614 | * | 10/1989 | (JP) . |
| 2-308918 | * | 12/1990 | (JP) . |

* cited by examiner

*Primary Examiner*—Paul N. Dickson
(74) *Attorney, Agent, or Firm*—Sidley Austin Brown & Wood, LLP

(57) ABSTRACT

A motor vehicle has an internal combustion engine and an exhaust system with an exhaust which has two flexible pipe members and at least one casing arranged downstream of said pipe members and belonging to a catalytic converter and/or silencer. The two flexible pipe members have a bellows and define a straight connecting line which passes through said pipe members, for example at least approximately through their centers, and at least approximately intersects a virtual axis about which the engine casing executes swivel movements during operation as a result of changes in power and/or operations of the internal combustion engine. The swivelling movements of the engine casing then cause essentially only bending movements with virtually no changes in length and shear movements of the bellows, so that the latter have a long service life.

14 Claims, 2 Drawing Sheets

EXHAUST SYSTEM FOR A MOTOR VEHICLE AND MOTOR VEHICLE AND METHOD FOR THE FORMATION OF AN EXHAUST SYSTEM

BACKGROUND OF THE INVENTION

1. Field of the Invention

The invention relates to an exhaust system. The exhaust system is intended, for example, for a car but may also be used for another motor vehicle—for example a truck or bus. The internal combustion engine may consist of a gasoline or diesel engine.

2. Description of the Prior Art

The engine housing of the internal combustion engine of a motor vehicle is usually held on the vehicle body by retaining means in such a way that it is slightly mobile, elastically mounted and damped with respect to vibration. When the motor vehicle is used, rapid load changes and rapid changes in the speed of the engine shaft and/or of the torque output by said shaft cause rapid changes in the power of the internal combustion engine. These may in turn give rise to movements, namely approximately rotation and/or swivelling of the engine casing about a virtual axis of rotation and/or pivot axis. Furthermore, the internal combustion engine produces vibrations or oscillations of the engine casing. These may cause, inter alia, periodic swivelling back and forth or torsional oscillations about the virtual axis of rotation and/or pivot axis. The virtual axis generally does not coincide with the geometric axis of rotation of the engine shaft and is, for example, offset from the axis of rotation of the engine shaft and approximately parallel to said axis. In the case of the swivelling caused by power changes and/or by vibrations, the engine casing may be swivelled back and forth or rotated through angles which are, for example, up to about 5°.

Known exhausts have an exhaust section which is rigidly connected to the engine casing and is connected via a flexible pipe member to at least one catalytic converter and/or silencer arranged downstream of said pipe member and having a casing. If the exhaust section located downstream of a flexible pipe member contains a plurality of casings, a flexible pipe member is sometimes also arranged between the successive casings. The flexible pipe members have, for example, a bellows. The exhaust section located downstream of a flexible pipe member is usually held displaceably on the vehicle body by, for example, retaining means having rubber rings.

During operation, the exhaust section connected rigidly to the engine housing is concomitantly moved by the swivelling engine casing and, when connected to the (first) flexible pipe member, executes swivelling movements whose arc lengths are—depending on the distance from the virtual axis—for example several centimeters and cause considerable deformations of the bellows. When these movements occur, the distance of the entrance of the bellows from the (first) casing is usually changed. In general, the result of this is that the bellows is not only frequently bent but at the same time is also alternately compressed and extended and frequently also subjected to shear movements. Bellows may withstand a very large number of bending movements without damage. Furthermore, small changes in the length of the bellows are also permissible. However, length changes and especially shear movements occurring simultaneously with bending movements give rise to considerable stresses in the bellows and shorten their service life.

SUMMARY OF THE INVENTION

It is therefore the object of the invention to provide an exhaust system which overcomes disadvantages of the known exhaust systems and in particular permits a long service life of the (first) flexible pipe member which follows, along the exhaust gas flow path, the exhaust section connected rigidly to the engine casing.

This object is achieved according to the invention by an exhaust system for a motor vehicle which has a vehicle body and an internal combustion engine with an engine casing and which has an exhaust connectable to the internal combustion engine and having a first flexible pipe member, a second flexible pipe member, connected to said first pipe member via a pipe, and at least one casing arranged downstream of said second pipe member and belonging to the catalytic converter and/or silencer, wherein the two flexible pipe members define a straight line which at least approximately intersects a virtual axis about which the engine casing can swivel during operation.

The invention furthermore relates to a motor vehicle having an exhaust system and having a vehicle body and an internal combustion engine, the engine casing of the latter being held on the vehicle body, wherein the exhaust is formed and is held on the vehicle body by retaining means in such a way that a straight line passing through the two pipe members at least approximately intersects the virtual axis about which the engine casing can swivel during operation.

It is also an object of the invention to provide a method for the formation of an exhaust system for a motor vehicle which has a vehicle body and an internal combustion engine with an engine casing and which has an exhaust connectable to the internal combustion engine and having a first flexible pipe member, a second flexible pipe member, connected to said first pipe member via a pipe, and at least one casing arranged downstream of said second pipe member and belonging to a catalytic converter and/or silencer, wherein a virtual axis is determined about which the engine casing swivels during operation, and wherein the exhaust is formed and arranged in such a way that a straight line passing through the two flexible pipe members at least approximately intersects the virtual axis.

According to the invention, two flexible pipe members connected to one another by a pipe define a straight line which passes through the two flexible pipe members, for example approximately through their centers, and at least approximately intersects the virtual axis of rotation and/or pivot axis. The position and direction of the virtual axis are dependent on the formation of the internal combustion engine and on the retaining means mentioned with which the engine casing is held on the vehicle body with vibration damping. The position and direction of the virtual axis may also be dependent on the condition of the motor vehicle and of the internal combustion engine, for example on the temperature of the internal combustion engine and/or on the speed of the engine shaft and/or the power instantaneously generated by the internal combustion engine. Furthermore, changes in power may result in a slightly rolling movement of the engine casing. Moreover, the vibration may also cause more or less linear movements of the engine casing so that swivel movements and linear movements are superposed. In addition, driving of the vehicle may also cause movements of the engine casing. Thus, owing to changes in power and/or oscillations, the engine housing often executes not pure swivel movements but only approximately swivel movements about a virtual axis. Furthermore, the position and direction of the virtual axis may also be dependent to a slight extent on the swivel angle or on the amplitude of a swivel movement which has just occurred and/or on the instantaneous swivel position of the engine casing. The positions and shapes of the flexible pipe members may also be dependent on the condition of the internal combustion engine and of the exhaust system, in particular on the temperature of the exhaust. However, the position and direction of the virtual axis can be determined experimentally for a specific condition of the motor vehicle and internal combustion engine, for example for a stationary vehicle after reaching the normal mean operating temperature of the engine at a mean engine power and for a mean swivel position of the engine casing. The flexible pipe members can then be arranged, according to the invention, in such a way that the straight line passing through the flexible pipe members, for example approximately through their centers, at least approximately and, for example, exactly intersects the virtual axis in a specific condition of the motor vehicle, of the internal combustion engine and of the exhaust system—for example with a stationary vehicle, cold, stationary engine and cold exhaust and/or a stationary vehicle, approximately normal, mean operating temperatures of the internal combustion engine and of the exhaust and mean, constant power and mean position, in particular mean swivel position, of the internal combustion engine.

The two flexible pipe members preferably each have a bellows. The pipe connecting the two flexible pipe members is preferably free of other components, such as silencers, and is furthermore essentially rigid. The first silencer casing and/or catalytic converter casing arranged downstream of the second flexible pipe member along the exhaust gas flow path is held on the motor vehicle in such a way that it is preferably vibration-damped but can be deflected only by small distances.

If, during operation of the internal combustion engine, the engine casing executes, at least approximately, swivel movements about the virtual axis owing to changes of power of said internal combustion engine and/or owing to vibrations generated by the internal combustion engine, the exhaust system according to the invention has the advantage that the flexible pipe members are bent by the swivel movements of the engine casing without the lengths of the flexible pipe members being significantly changed. The length of a flexible pipe member means the length measured along and on its axis, this axis running in the longitudinal direction of the pipe member and in the general direction of flow. Furthermore, shearing of the flexible pipe members can also be substantially avoided. The two flexible pipe members therefore have a long service life. Moreover, the arrangement, according to the invention, of the two flexible pipe members helps to ensure that the exhaust system can be made light and nevertheless has a long life.

BRIEF DESCRIPTION OF THE DRAWINGS

The subject of the invention is illustrated below with reference to the embodiments shown in the drawings. In the drawings.

DESCRIPTION OF THE PREFERRED EMBODIMENTS

Figure 1:
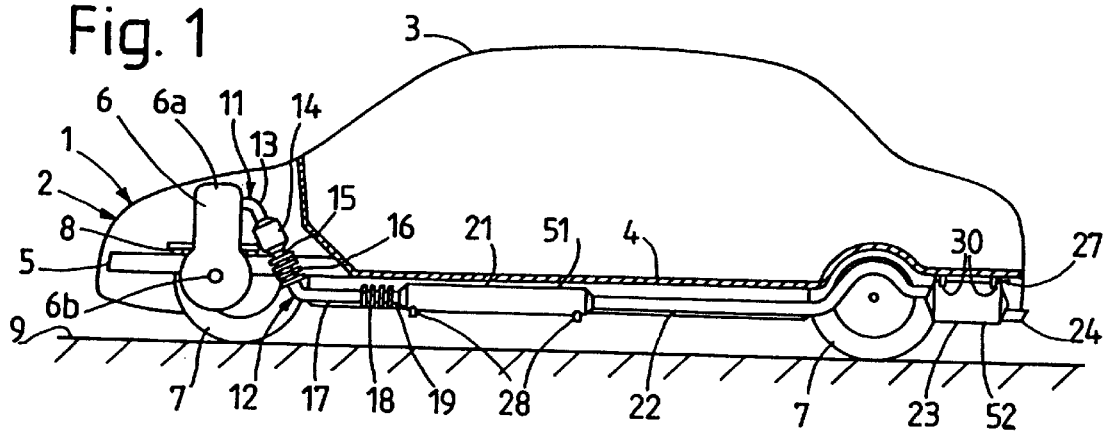
FIG. 1 shows a motor vehicle having an exhaust system, drawn schematically and partly as a view and partly in section.
Figure 2:
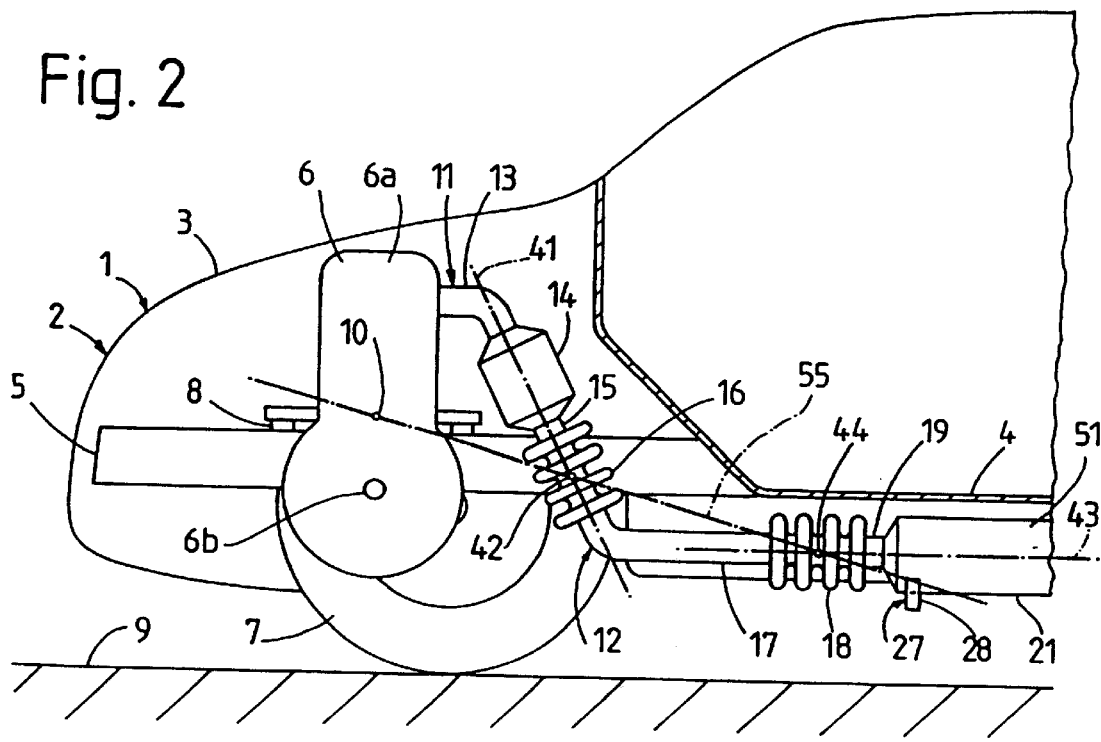
FIG. 2 shows a section from FIG. 1 on a larger scale.

The motor vehicle 1 shown schematically in FIG. 1 and in part in FIG. 2 consists of a car and has a vehicle body 2. This has bodywork 3, a vehicle floor 4 and a chassis 5. The bodywork is, for example, self-supporting and also forms at least a part of the floor and/or of the chassis. The vehicle body 2 holds an internal combustion engine 6 and wheels 7. The internal combustion engine 6 has an engine casing 6a and an engine shaft 6b. The engine casing 6a is held on the chassis 5 by retaining means 8 which have deformable rubber blocks or the like, in such a way that said casing is slightly mobile, elastic and vibration-damped. The engine casing 6a has a plurality of exhaust gas outlets, with each of which an engine cylinder is coordinated. The motor vehicle 1 stands with its wheels on a horizontal driving plane 9. The engine shaft 6b is in general parallel to the driving plane 9 and at right angles to the longitudinal direction of the vehicle. During operation of the internal combustion engine 6, the engine casing 6a can execute approximately back and forth rotations or swivelling motions about a virtual axis of rotation or pivot axis 10. This is, for example, approximately parallel to the engine shaft 6b and offset from this and therefore approximately parallel to the driving plane 9 and approximately at right angles to the longitudinal direction of the vehicle.

The motor vehicle has an exhaust system 11 with an exhaust 12. This has in succession, in the direction of flow of the exhaust gas, an inlet and collecting apparatus 13, at least one catalytic converter 14, a connection 15, a first elastically deformable, in particular flexible pipe member 16, a bent pipe 17, a second elastically deformable, in particular flexible pipe member 18, a connection 19 which may have a short pipe, a first silencer 21, a relatively long, bent pipe 22, a second silencer 23 and an outlet formed by a pipe 24 and opening into the environment. The internal combustion engine 6 is located at the front end of the motor vehicle 1. The exhaust 12 runs from the internal combustion engine 5 to the rear of the vehicle and is located to a large extent underneath the vehicle floor 4. The exhaust system 11 furthermore includes retaining means 27. These have four holders 28, 30 which connect the two silencers 21 and 23 in the vicinity of their ends to a rigid part of the vehicle body 2, namely to the vehicle floor 4.

The inlet and collecting apparatus 13 has an exhaust manifold which has, for each exhaust gas outlet of the engine, an inlet pipe connected to one of the exhaust gas outlets of the engine casing. The apparatus 13 furthermore has collective connecting means connecting the outlets of the inlet pipes to one another and has an outlet common to all inlet pipes. The inlet and collecting apparatus 13 is, for example, completely rigid or at least formed in such a way that the common outlet is rigidly connected to the engine casing 6a. The catalytic converter 14 has a rigid casing with an inlet which is rigidly connected to the common outlet of the inlet and collecting apparatus 13. The pipes 17, 22, 24 and any pipes present in the connections 15, 19 are rigid. The inlet and collecting apparatus 13, the casing of the catalytic converter 14, the pipes 17, 22 and 24 and the connections 15, 19 consist of metallic materials, for example stainless steel. The successive parts 13 to 24 of the exhaust are tightly connected to one another.

Figure 3:
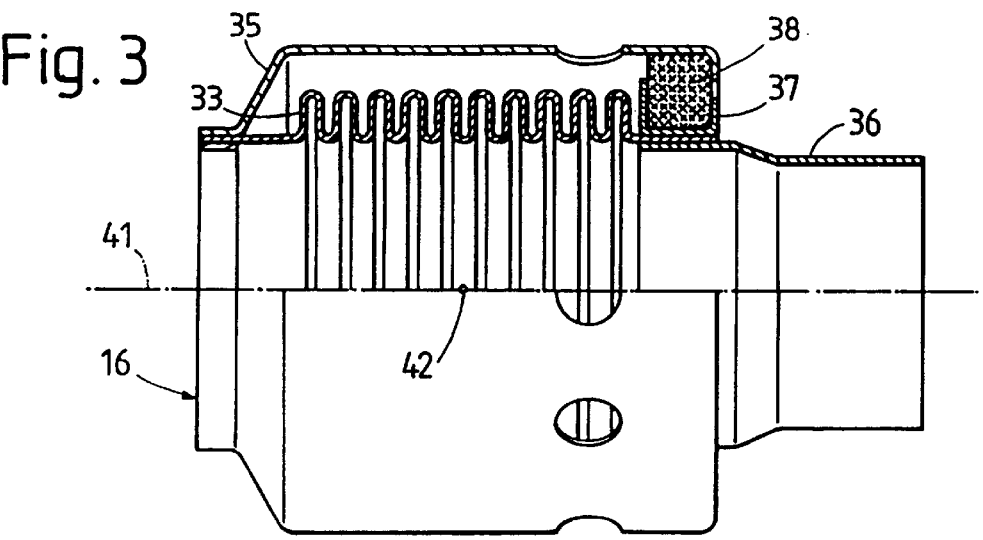
FIG. 3 shows a flexible pipe member of the exhaust system, represented partly as a view and partly as an axial section.

The first of the two elastically deformable, flexible pipe members 16, 18 shown only schematically in FIGS. 1 and 2 is shown separately in FIG. 3 and has a bellows 13, a sleeve 35 enclosing said bellows in cross-section, a socket end 36, a ring 37 which is approximately U-shaped in cross-section and has a channel open to the outside and a deformable damping member 38 held in said channel. Said damping member is formed by a multilayer wire fabric shaped into a ring of solid cross-section and projects outward out of the channel of the ring 37. The stated parts of the flexible pipe member 16 consists of metallic materials, for example stainless steel. The bellows 33 has a cylindrical end section at both ends and is rigid at its end located on the left in FIG. 3 and is tightly connected, namely welded, to the end of the sleeve 35. These ends of the bellows 33 and of the sleeve together form the first connection—namely the inlet—of the pipe member 16. That end of the bellows which is located on the right in FIG. 3 is firmly and tightly connected, namely welded, to the further end section of the socket end 36 and to the ring 37. The other, narrower end section of the socket end 36 forms a second connection—namely the outlet—of the pipe member. The sleeve 35 has a cylindrical middle section which is separated from the outer wave summits of the bellows by an intermediate space and has a few holes. That end section of the sleeve 35 which is located on the right in FIG. 3 is bent inward and surrounds a section of the damping member 38. The first pipe member 16 is straight in the undeformed, relaxed state, then defines a straight pipe member axis 41 and is in general rotationally symmetrical with respect to said axis. The first flexible pipe member 16 defines at least approximately a pipe member center 42 which lies on the axis 41 and is located, for example, in the middle of the wavy section of the bellows 33. The sleeve 35 protects the bellows 33 from mechanical effects from the outside and, together with the parts 36, 37, 38, limits the deformations, i.e. the bending movements, extensions and shortenings of the bellows. The pipe member 16 is formed, for example, in such a way that it can be bent by at least 5°.

The second, elastically deformable, flexible pipe member 18 is formed identically or similarly to the first pipe member, is straight in the undeformed state and then defines a straight pipe member axis 43 and at least approximately a pipe member center 44.

The first silencer 21 has the first casing 51 arranged downstream of the flexible pipe members 16, 18, and the second silencer 23 has the second casing 52 arranged, based on the direction of flow of the exhaust gas, after the flexible pipe members.

The exhaust gas outlets of the engine casing 6a are located on that side of the engine casing which faces the rear of the vehicle. The two flexible pipe members 16, 18 are located on that side of a plane, perpendicular to the driving plane 9 and passing through the virtual axis 10, which is closer to the rear of the vehicle. The first flexible pipe member 16 is directed downward away from the connection 15 and its inlet so that the axis 41 of the pipe member makes an angle with the driving plane 9 and is inclined or perpendicular to said plane. The axis 43 of the second pipe member 18 is, for example, approximately parallel to the horizontal driving plane 9 or makes at most a small angle with said plane. The axis 43 of the second pipe member 18 is furthermore, for example, approximately parallel to the longitudinal direction of the vehicle and, for example, approximately coincides with the axis of the first casing 51 of the first silencer. The two axes 41, 43 of the pipe members, which axes are straight, for example at least in the case of a stationary, cold engine and cold exhaust, may or may not intersect but preferably make an angle with one another which is, for example, at least 30°. FIGS. 1 and 2 also show a straight connecting line 55 between the pipe members. In the case of a cold, stationary internal combustion engine and cold exhaust and/or when the engine and the exhaust are at the operating temperatures and when the engine casing is in the middle swivel position, said straight line passes through the two pipe members 16, 18, namely, for example, at least approximately through their centers 42, 44, and furthermore at least approximately intersects the virtual axis of rotation and/or pivot axis 10 of the internal combustion engine. The straight connecting line 55 between the pipe members is, for example, inclined relative to the driving plane. The two centers 42, 44 lie on the straight line 55 on the same side as the virtual axis 10.

Figure 4:
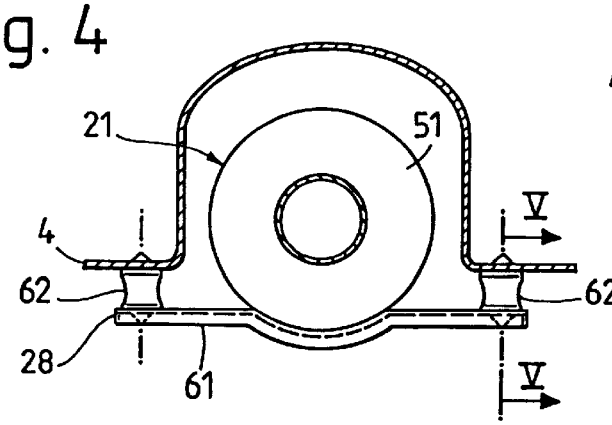
FIG. 4 shows an end view of the first silencer of the exhaust system.
Figure 5:
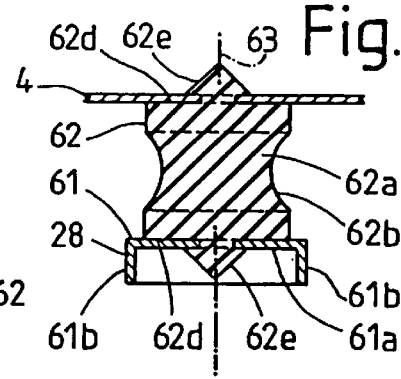
FIG. 5 shows a section through the holder serving for holding the first silencer, along the line V—V of FIG. 4, on a larger scale than FIG. 4.

The first casing 51 of the first silencer 21 also shown in FIG. 4 has a tight wall with an essentially cylindrical shell and two end walls facing away from one another and connected tightly and firmly to the shell. The two holders 28 which serve for fastening the first silencer 21 are, for example, formed identically or similarly, are a distance apart along the silencer and are fastened to the shell of the silencer 21 in the vicinity of the two ends of said silencer. The holder 28 is formed, for example, according to FIGS. 4 and 5, in which a section of the vehicle floor 4 is also shown. This is, for example, generally more or less flat but has an upward-projecting bulge. This bounds a channel open downward, which is frequently referred to as a tunnel and contains at least part of the exhaust 12, at least a cross-sectional part of the first silencer 21 and, for example, also a shaft which is not shown.

Each holder 28 has a retaining member 61 directly engaging the casing 51 of the first silencer 21 and has two connecting members 62 connecting said retaining member to the vehicle floor 4. The retaining member 61 consists of the metallic material, for example stainless steel, is rigid, elongated and arranged at right angles to the silencer 21 and consists essentially of a U-profile bar with a web 61a and two limbs 61b. The middle section of the retaining member 61 is curved parallel to the cross-sectional shape of the shell of the silencer casing 51, rests with the outer, top surface of the web 65a on the lower side of the silencer casing, on the shell thereof, and is fastened to the shell, for example, by a few spot welds or other weld connections. Each connecting member 62 is at least partly elastically deformable and consists, for example, of a one-piece, rubber-elastic body of synthetic and/or natural rubber. Each connecting member 62 is essentially rotationally symmetrical with respect to an axis 63 approximately at right angles to the driving plane 9 and thus approximately vertical and has a main section 62a. This consists of a compact block, has a solid cross-section over its entire axial dimension and thus contains no free cavities or intermediate spaces or holes. The main section 62a has a generally cylindrical circumferential surface 62b which however is slightly concave in the middle region in the axial section and flat, annular support and/or end surfaces 62d at its two ends and is associated in the middle region of each end with an approximately mushroom-shaped extension which projects away from said end in the axial direction and forms fastening and/or connecting means 62e. The two connecting members 62 belonging to the same holder 28 are staggered relative to one another along the retaining member 61 of the relevant holder and are arranged in the vicinity of the ends of the retaining member 61. Each connecting member lies with the flat support and/or end surfaces 62b on the upper surface of the web 61a of the retaining member 61 or on a section of the lower surface of the vehicle floor 4.

The connecting members 62 connecting the first casing 51 to the vehicle floor 4 permit certain movements of the first casing 51, which however are only relatively small in all directions. The connecting members 62 of the holder 28 are preferably formed in such a way that, when the exhaust is assembled and preferably also in the state separated from the remaining exhaust, the first casing 51 is deflected by at most 5 mm and preferably at most 2 mm from the middle and/or rest position by constant, steady acceleration, acting on the casing, of 10 m/s$^2$ and, for example, also 20 m/s$^2$ or even 50 m/s$^2$ or a constant, steady force of 100 N with any direction relative to the vehicle body.

The holders 30 which serve for holding the second casing 52 of the second silencer are in part formed similarly to the holders 28 and likewise have retaining members essentially comprising metallic U-profile bars bent in parts and connecting members which are at least partly rubber-elastic. The retaining members of the holders 30 are, however, fastened to the upper side of the second casing. Furthermore, the main sections of the connecting members of the holders 30, which sections consist of rubber, are not rotationally symmetrical with effect to an axis but approximately cuboid and arranged in such a way that, in the state separated from the remaining exhaust, the second casing 52 is deflected from its rest position substantially more by a force acting on it and approximately parallel to a straight casing connecting line passing through the centers of the two casings 51, 52 than by a force of the same magnitude which is at right angles to the casing connecting line and otherwise acts in any direction.

The virtual axis of rotation and/or pivot axis 10 is not shown on the internal combustion engine 6 but can be determined experimentally. For this purpose, for example, at least one drawing board having a drawing surface formed by a piece of paper, or the like, can be fastened to the vehicle body in such a way that the drawing surface is approximately perpendicular to the virtual axis. Furthermore, at least two pens can be connected to the engine casing at points not located precisely on the virtual axis, in such a way that they touch the or a drawing surface. When the engine casing executes swivel movements during operation of the internal combustion engine, the pens draw arcs on the drawing surface. From these arcs, it is then possible to determine the position of the virtual axis. Instead of mounting pens on the engine casing, at least one point not lying on the virtual axis and, for example, two or more such points can be defined by mounting a point and/or a reflector or in another manner, the trajectory of each defined point can be determined by suitable detection means and the position and direction of the virtual axis can be determined therefrom.

The exhaust 12 is heated by the hot exhaust gas fed to it during operation of the internal combustion engine. The rigid parts of the exhaust are therefore lengthened by the thermal expansion. The thermally caused changes in length of the rigid exhaust parts arranged upstream of the first silencer 21 are at least for the most part compensated by the two elastically deformable, flexible pipe members 16 and 18. The bellows of the pipe members 16, 18, which bellows have approximately straight axes in the rest state, are then bent and possibly also slightly compressed during operation of the engine. When the exhaust cools again after the engine has been switched off, the rigid exhaust parts and bellows assume their original length and shapes again. The lengths of the bellows may thus be temporarily changed on compensation of the thermally caused changes in length. However, these changes in length occur much less seldom and more slowly than the back and forth movements caused by the swivelling movements of the engine casing and therefore have virtually no effect on the service life of the bellows.

The exhaust part connecting the first casing 51 to the second casing 52 is formed at least essentially by the bent pipe 22, contains neither bellows nor other deformable pipe members and is thus essentially rigid everywhere. The change in length of the pipe 22 caused by the hot exhaust gas and the relatively large force thus produced by said pipe and pushing the two silencer casings apart results in bending of the rubber-elastic connecting members, in particular of the connecting members present on the second housing 52. The lengthening of the pipe 22 is therefore for the most part compensated by an elastic bending of the last-mentioned connecting members and a displacement or deflection of the second casing.

If the engine casing executes swivel movements owing to changes in power and/or vibrations of the internal combustion engine, the center 42 of the first flexible pipe member 16 is moved back and forth approximately along an arc whose center is on the virtual axis 10. The center 42 is thus moved almost at right angles to the connecting line 55 between the pipe members. The distance between the two centers 42 and 44 of the pipe members is therefore at most slightly changed during the swivel movements of the engine casing. Accordingly, the bellows of the flexible pipe members 16, 18 are bent back and forth during the swivelling movements of the engine casing without the lengths of the bellows, measured along the axes of the pipe members, changing significantly. Furthermore, the bellows are subjected to virtually no shearing.

Of the exhaust parts arranged downstream of the first deformable pipe member 16, the silencers have the greatest mass per unit length. The rubber-elastic connecting members of the holders 28, 30 connect the two silencers in a slightly mobile and elastic manner to the vehicle floor. However, as described, the connecting members 62 permit only small deflections of the first silencer in all directions. The connecting members of the holder 30 keep deflections of the second silencer, in particular in all directions at right angles to the stated connecting line between casings, very small and also restrict displacements parallel to the connecting line between casings. The pipes 22, 24 and in particular the two silencers 21, 23 are therefore deflected at most slightly from their middle positions, which they assume after reaching the operating temperatures due to the thermal changes in dimensions, by swivelling movements of the engine casing which take place as a result of changes in power of the internal combustion engine, by the vibrations produced during normal operation of the internal combustion engine and by any oscillations generated by the pulsating exhaust gas. The accelerations produced during normal driving of the motor vehicle as a result of uneven ground, curves and acceleration and braking operations and acting on the exhaust also cause at most small deflections from the stated middle positions.

The pipes arranged downstream of the catalytic converter 14 and in particular of the first elastically deformable pipe member 16 and of the second deformable pipe member 18 need not absorb any large accelerations and forces caused by the changes in power of the engine and/or the vibrations and/or driving. The pipes 17, 22 and 24 therefore need to support essentially only their own weight and possibly also partly the weight of the elastically deformable pipe members 16, 18. It is therefore not necessary to hold the pipes 17, 22, 24 on the vehicle body by holders directly engaging said pipes themselves. The pipes 17, 22, 24, the silencer casings and the pipes present in the silencers may furthermore be made thin-walled and light.

Figure 6:
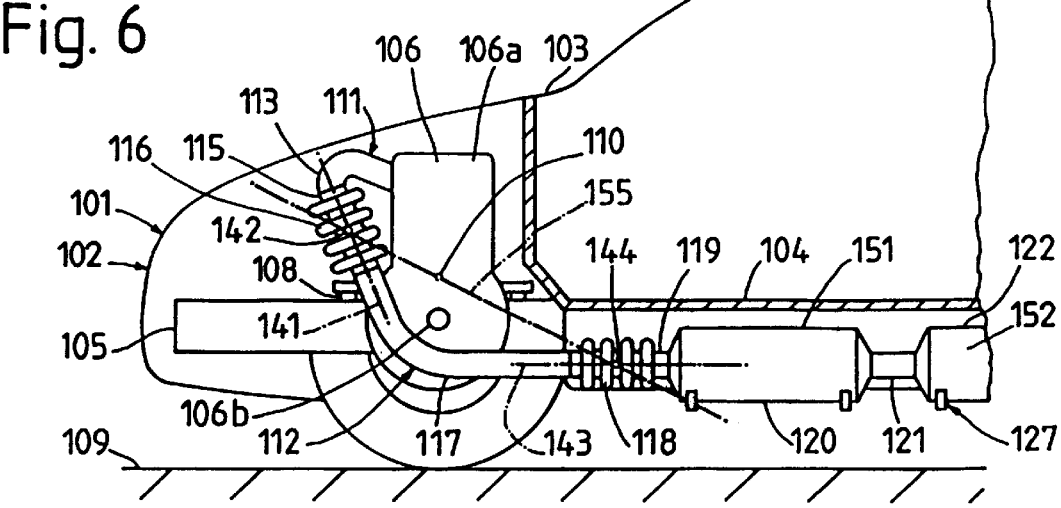
FIG. 6 shows a section, analogous to FIG. 2, of a motor vehicle having another exhaust system.

The motor vehicle 101 shown in part in FIG. 6 once again consists of a car, has a vehicle body 102 with bodywork 103, a vehicle floor 104 and a chassis 105 and an internal combustion engine 106 with an engine casing 106a and an engine shaft 106b. The engine casing 106a is movably held on a chassis 105 by retaining means 108. The motor vehicle stands on a driving plane 109. During operation, the engine casing executes swivel movements about a virtual axis of rotation and/or pivot axis 110. The vehicle furthermore has an exhaust system 111 with an exhaust 112. This has in succession along the exhaust gas flow path—beginning at the engine—an inlet and collecting apparatus 113 with an exhaust manifold and a common outlet, a connection 115, a first elastically deformable, flexible pipe member 116, a rigid pipe 117, a second elastically deformable, flexible pipe member 118, a connection 119, a catalytic converter 120, a connection 121, a silencer 122 and, for example, also a second silencer, which is not shown, and additional pipes. The catalytic converter 120, the silencer 122 and the silencer not shown are held on the vehicle floor 104 by retaining means 127.

The two flexible pipe members 116 and 118 have a pipe member axis 141 and 143, respectively, and a pipe member center 142 and 144, respectively. The two pipe members 116, 118 define a straight connecting line 155 which passes through the two pipe members, namely at least approximately through their centers 142 and 144, and at least approximately intersects the virtual axis 110 in the cold, stationary engine and/or after reaching the normal operating temperatures during operation and when the engine casing is in the middle swivel position.

The engine shaft 106b is once again at right angles to the longitudinal direction of the vehicle. However, the exhaust gas outlets of the engine casing 106a face the front end of the vehicle. The two pipe members 116, 118 are therefore located on different sides of a plane perpendicular to the driving plane 9 and passing through the virtual axis 110. The two centers 142, 144 are accordingly located on the straight line 155 on different sides of the virtual axis 110.

Moreover, the exhaust 112 differs from the exhaust 12 in that the catalytic converter 120 has the first casing 151 arranged downstream of the flexible pipe member 116, 118. The silencer 122 then forms the second casing 152, and the second silencer, which is not shown, forms the third casing. Unless stated otherwise above, the motor vehicle 101 and its exhaust system 111 are formed similarly to the motor vehicle 1 and the exhaust system 11, respectively, and accordingly also have similar properties.

The motor vehicles and exhausts can be modified in various ways. For example, the flexible pipe members may have curved axes when the engine is in the nonoperating state and/or when the engine and the exhaust have reached the operating temperature during operation and the engine housing assumes its middle swivel position. In these cases, the tangents to the curved axes of the pipe members can then make an angle of at least 30° with one another.

It is also possible to combine features of the motor vehicles 1, 101 and their exhaust systems 11, 111 with one another. Furthermore, the connecting members 62 may be formed from composite structures which, in addition to a part consisting of rubber, have metallic fastening and/or connecting means. Moreover, the exhaust may have a combined catalytic converter/silencer whose casing forms the first casing arranged downstream of the flexible pipe member.

Finally, reference is also made to the U.S. patent application Ser. No. 09/067504 with the priority of Swiss Patent Application No. 988/1997, for the same applicant and whose content is hereby incorporated in the present patent application, if there are no contradictions.

What is claimed is:

1. A motor vehicle, comprising an exhaust system; a vehicle body; and an internal combustion engine with an engine casing, the exhaust system having an exhaust connected to the engine casing and having a first flexible pipe member, a second flexible pipe member connected to said first pipe member via a pipe, and at least one casing arranged downstream of said second pipe member and forming part of at least one of a catalytic converter and silencer, wherein the engine casing is held on the vehicle body by retaining means in such a way that the engine casing can swivel about a virtual axis during operation, wherein the exhaust system further includes retaining means connecting the exhaust downstream of the second flexible pipe member in such a way to the vehicle body that the at least one casing is deflected in any direction relative to the vehicle body by at most 5 mm by one of a constant acceleration of at least 10 $^m/s^2$ and a constant force of 100 N acting on the at least one casing, and that the two flexible pipe members define a straight line which at least approximately intersects the virtual axis wherein each of the first and second flexible pipe member has a pipe member axis, wherein the two pipe member axes are straight in a state of the flexible pipe members, and wherein the pipe connecting the first flexible pipe member to the second flexible pipe member is bent such that the pipe member axes make an angle of at least 30° with one another.

2. The motor vehicle as claimed in claim 1, wherein said straight line passes through the centers of the two flexible pipes in at least one of non-operational state of the motor vehicle, internal combustion engine, and exhaust and an operational state of the motor vehicle, internal combustion engine and exhaust.

3. The motor vehicle as claimed in claim 1, wherein said straight line intersects with the virtual axis in at least one of non-operational state of the motor vehicle, internal combustion engine, and exhaust and an operational state of the motor vehicle, the internal combustion engine and the exhaust.

4. The motor vehicle as claimed in claim 1, wherein the pipe, which connects the first and second flexible pipe members, is free of casings and of retaining members.

5. The motor vehicle as claimed in claim 1, wherein each of the two flexible pipe members has a bellows.

6. The motor vehicle as claimed in claim 5, wherein the bellows of each of the two flexible pipe members has a wavy section and a pipe member center in the middle of the wavy section and wherein said straight line runs through the pipe member centers of the two flexible pipe members.

7. The motor vehicle as claimed in claim 1, wherein the internal combustion engine has an engine shaft which extends at a right angle to a longitudinal direction of the motor vehicle.

8. The motor vehicle as claimed in claim 1, wherein the virtual axis extends approximately at a right angle to a longitudinal direction of the motor vehicle.

9. The motor vehicle as claimed in claim 1, wherein said straight line is inclined relative to a driving plane on which the motor vehicle stands.

10. The motor vehicle as claimed in claim 1, wherein the retaining means hold the exhaust such that the at least one casing is deflected in any direction relative to the vehicle body by at most 2 mm by one of a constant acceleration of at least 10 m/s² and constant force of 100 N acting on the at least one casing.

11. A motor vehicle, comprising a vehicle body; an internal combustion engine with an engine casing; and an exhaust system; wherein the exhaust system includes an exhaust connected to the engine casing and having a first flexible pipe member, a second flexible pipe member connected to said first pipe member via a pipe and at least one casing arranged downstream of said second flexible pipe member and forming part of at least one of a catalytic converter and silencer, wherein each of the first and second flexible pipe members comprises a bellows and has a pipe member axis, wherein the two pipe member axes are straight in a state of the flexible pipe members, wherein the pipe connecting the first flexible pipe member to the second flexible pipe member is configured such that the pipe member axes make an angle of at least 30° with one another, and wherein the exhaust system further comprises retaining means connecting the exhaust downstream of the second flexible pipe member to the vehicle body such that the at least one casing is deflected in any direction relative to the vehicle body by at most 5 mm by one of a constant acceleration of at lest 10 m/s² and constant force of 100 N acting on the at least one casing and that the bellows of the two flexible pipe members define a straight line which at least approximately intersects a virtual axis about which the engine casing can swivel during operation of the engine, and wherein the pipe connecting the first flexible pipe member to the second flexible pipe member is bent and free from the retaining means, and wherein the exhaust is free from casings between the two flexible pipe members.

12. The motor vehicle as claimed in claim 11, wherein the retaining means hold the exhaust such that at least the first casing downstream of the second flexible pipe member is deflected in any direction relative to the vehicle body by at most 2 mm by the one of a constant acceleration of at least 10 m/s² and constant force of 100 N acting on the casing.

13. The motor vehicle of claim 11, further comprising wheels with which the vehicle stands on a driving plane, wherein the pipe member axis of the first flexible pipe member forms in the straight state an angle with the driving plane and wherein the pipe member axis of the second flexible pipe member is in the straight state at least one of approximately parallel to the driving plane and of making at most a small angle with the driving plane.

14. The motor vehicle of claim 11, further comprising wheels with which the vehicle stands on a driving plane, wherein the pipe member axis of the first flexible pipe member forms in the straight state an angle with the driving plane and wherein the pipe member axis of the second flexible pipe member is in the straight state at least one of approximately parallel to the driving plane and of making at most a small angle with the driving plane.

* * * * *